United States Patent
Tinoco

(10) Patent No.: US 7,256,920 B2
(45) Date of Patent: Aug. 14, 2007

(54) ELECTRO-OPTIC MODULATOR

(75) Inventor: Eduardo Tinoco, San Jose, CA (US)

(73) Assignee: Bookham Technology plc, Northamptonshire (GB)

( * ) Notice: Subject to any disclaimer, the term of this patent is extended or adjusted under 35 U.S.C. 154(b) by 76 days.

(21) Appl. No.: 10/977,917

(22) Filed: Oct. 30, 2004

(65) Prior Publication Data

US 2006/0092494 A1 May 4, 2006

(51) Int. Cl.
*G02B 26/00* (2006.01)
(52) U.S. Cl. .................. 359/238; 329/337; 331/151
(58) Field of Classification Search ............... 359/238
See application file for complete search history.

(56) References Cited

U.S. PATENT DOCUMENTS

| | | | | |
|---|---|---|---|---|
| 5,189,547 A | | 2/1993 | Day et al. ............... | 359/245 |
| 5,787,126 A | * | 7/1998 | Itoh et al. ............... | 375/340 |
| 6,160,374 A | * | 12/2000 | Hayes et al. ............ | 320/108 |
| 6,693,573 B1 | * | 2/2004 | Linder .................... | 341/143 |
| 2006/0039169 A1 | * | 2/2006 | Chen et al. ............. | 363/17 |

OTHER PUBLICATIONS

Day, Timothy. *Resonant modulators operate over wide frequency ranges*. Technology Guide: Modulators. Laser Focus World. May 1992. pp. 183-188.
*Practical Uses and Applications of Electro-Optic Modulators.* Application Note 2. New Focus Inc. Copyright 2001.

* cited by examiner

*Primary Examiner*—Jordan Schwartz
*Assistant Examiner*—Jessica Stultz
(74) *Attorney, Agent, or Firm*—Steven G. Roeder; James P. Broder

(57) ABSTRACT

A modulator circuit (28) for directing a voltage across a modulator element (26) to modulate a beam (20) includes a first inductor L1 that is electrically connected in parallel to the modulator element (26) and a second inductor L2 that is electrically connected in parallel to the first inductor L1 and the modulator element (26). A resonant frequency of the modulator circuit (28) is controllable over a range of between approximately 200 and 380 MHz. Additionally, the modulator circuit (28) can include a third inductor L3 that is electrically connected in parallel to the inductors L1, L2, and the modulator element (26). Further, the modulator circuit (28) can include an added capacitor (546) that is electrically connected in parallel to the inductors L1, L2, and the modulator element (26).

19 Claims, 3 Drawing Sheets

ELECTRO-OPTIC MODULATOR

BACKGROUND

Optical modulators are used to electrically modulate a laser beam from a laser source. One type of optical modulator includes a crystal and a drive circuit that applies a driving voltage across the crystal. In this design, the laser beam is directed at the crystal. The voltage across the crystal changes the index of refraction of the crystal. The amount in which the index of refraction is changed is proportional to the amount of voltage applied to it. With this design, the crystal changes the path length of the laser beam through the crystal in accordance with the frequency of the driving voltage. Thus, a laser beam emerging from the crystal is modulated by the frequency of the driving voltage.

Typically, a voltage source directs only a few volts to the driving circuit. However, the crystal requires a much higher voltage to properly modulate the beam. Accordingly, the drive circuit must direct a relatively high voltage to the crystal. Unfortunately, existing drive circuits can be relatively physically large in size, expensive, low in sensitivity, complicated, and/or inefficient to operate. Moreover, existing drive circuits may only be able to be tuned to relatively low resonant frequencies.

SUMMARY

The present invention is directed to a modulator circuit for directing a voltage across a modulator element to modulate a beam. In one embodiment, the modulator circuit includes a first inductor that is electrically connected in parallel to the modulator element and a second inductor that is electrically connected in parallel to the first inductor and the modulator element. A voltage source is electrically connected to the first inductor.

In one embodiment, at least one of the inductors is manually selectable adjustable to selectively adjust the inductance of the modulator circuit. With this design, the overall impedance and the resonant frequency of the modulator circuit is adjustable. In alternative, non-exclusive versions of the present invention, a resonant frequency of the modulator circuit is controllable over a range of between approximately 200 and 380 MHz, approximately 200 and 310 MHz, or approximately 310 and 380 MHz.

Further, in one embodiment, one or more of the inductors has a Q factor of at least approximately 200. Additionally, in one embodiment, the modulator circuit can also include a third inductor that is electrically connected in parallel to the first inductor, the second inductor, and the modulator element. The modulator circuit can also include an added capacitor that is electrically connected in parallel to the first inductor, the second inductor, and the modulator element. The added capacitor can be manually selectable adjustable to adjust the capacitance of the added capacitor.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
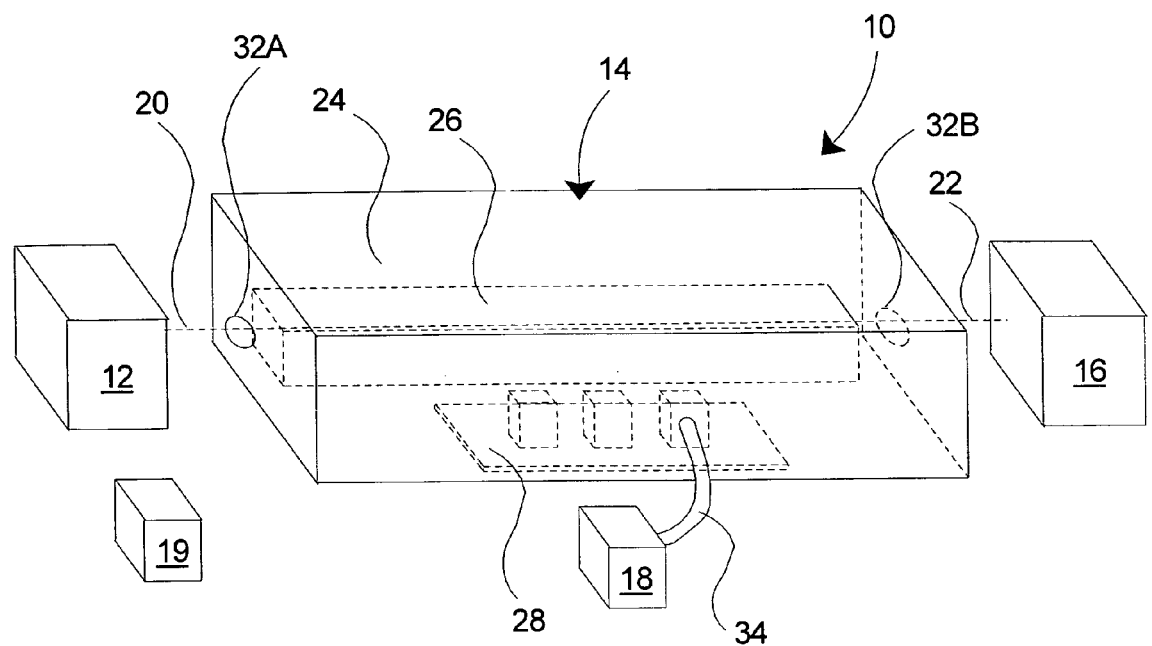
FIG. 1 is a simplified perspective view of a precision apparatus having features of the present invention.

Referring to FIG. 1, the present invention is directed to a precision apparatus 10 that, for example, can be used as or in manufacturing, technical or scientific instruments. The design and orientation of the components of the precision apparatus 10 can be changed to suit the requirements of the precision apparatus 10. FIG. 1 is a simplified perspective view of one embodiment of the precision apparatus 10. In this embodiment, the precision apparatus 10 includes a beam source 12, a beam modulator 14, an object 16, a voltage source 18 and a control system 19. However, one or more of these components can be optional.

The beam source 12 generates a beam 20 of light energy that is directed at the beam modulator 14. In one embodiment, the beam source 12 is a laser source and the beam 20 is a small diameter optical beam.

The beam modulator 14 is positioned in the path of the beam 20 and modulates the beam 20. In one embodiment, the beam 20 enters the beam modulator 14 and emerges from the beam modulator 14 as a modulated beam 22 that is directed to the object 16. As non-exclusive examples, the object 16 can be a mirror, lens, telescope, filter, emitter and/or detector.

FIG. 1 illustrates one embodiment of the beam modulator 14. In this embodiment, the beam modulator 14 includes a housing 24, a modulator element 26 (illustrated in phantom), and a modulator circuit 28 (illustrated in phantom). The design of each of these components can be modified to suit the design requirements of the beam modulator 14. In FIG. 1, the housing 24 encircles and encloses the modulator element 26 and the modulator circuit 28. With this design, the beam modulator 14 is a single housing, relatively compact electro-optical modulator. In another embodiment, as an example, the modulator element 26 and the modulator circuit 28 can be packaged in separate housings.

In FIG. 1, the housing 24 is rectangular box shaped and is made of a metallic material to provide an effective shield to electromagnetic radiation. This shielding can inhibit electromagnetic radiation generated by the modulator circuit 28 and the modulator element 26 from undesirably escaping the housing 24, and also can inhibit strong external fields from adversely influencing the operation of the modulator circuit 28 and the modulator element 26. In one embodiment, the housing 24 has a height of approximately 1.5 inches, a width of approximately 1 inch and a length of approximately 2 inches. With this design, the beam modulator 14 is a relatively small in size. In alternative, non-exclusive embodiments, the beam modulator 14 has an overall form factor of less than approximately 1.2, 1.5, or 2.3 inches.

In FIG. 1, the housing 24 includes small optical windows 32A, 32B on opposite sides thereof through which the beam 20, 22 passes and the modulator element 26 is positioned between the windows 32A, 32B. More specifically, the beam 20 is directed into the optical window 32A and the modulated beam 22 passes through the optical window 32B. Each window 32A, 32B is made of a material that allows the beam 20, 22 to pass there through. In one embodiment, each window 32A, 32B is made of a substantially transparent material. Alternatively, for example, each window 32A, 32B can be an opening in the housing 24.

Additionally, in FIG. 1, the housing 24 includes a housing aperture in one wall that allows a connector line 34 to electrically connect the voltage source 18 to the modulator circuit 28. In one embodiment, this is the only electrical connection that is required to drive the modulator circuit 28. In one embodiment, the adjustments are made to the modulator circuit 28 before the housing 24 is sealed.

The voltage source 18 directs a voltage to the modulator circuit 28. In one embodiment, the voltage source 18 includes a signal generator that provides a low voltage signal to the modulator circuit 28. In one embodiment, the voltage source 18 provides a sine or square wave having a peak-to-peak voltage of between approximately 0 and 30 volts with a frequency of between approximately 200 MHz and 380 MHz to the modulator circuit 28. Alternatively, the voltage source 18 can provide a voltage and/or frequency of greater or less than these amounts.

The control system 19 controls the operation of one or more components of the precision apparatus 10. The control system 19 can include one or more processors. In FIG. 1, the control system 19 is positioned away from the other components of the apparatus 10. Alternatively, the control system 19 can be incorporated partly or fully into one of the components of the apparatus 10.

Figure 2:
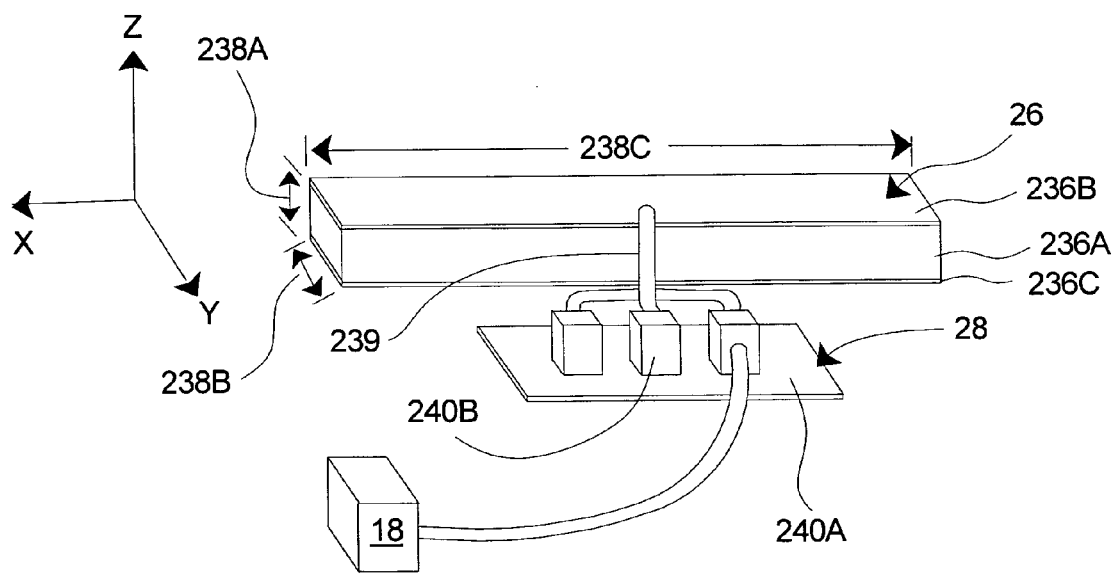
FIG. 2 is a simplified perspective view of a portion of the precision apparatus of FIG. 1.

FIG. 2 is a simplified view of the modulator element 26, the modulator circuit 28, and the voltage source 18. The design of the modulator element 26 can be varied. In one embodiment, the modulator element 26 has an index of refraction that changes in response to a voltage applied across the modulator element 26 and the modulator element 26 appears as a substantially pure capacitive load to the modulator circuit 28. Stated another way, the voltage across the modulator element 26 changes the phase of the beam 20 (illustrated in FIG. 1) that passes through the modulator element 26.

In FIG. 2, the modulator element 26 includes an element body 236A, a first electrode 236B, and a second electrode 236C. In one embodiment, the element body 236A is made of a material having an index of refraction that changes when a voltage is applied across the element body 236A. For example, the element body 236A can be made of a crystal material. The material for the crystal 21 can be, for example, lithium niabate or lithium tantalate.

In the embodiment illustrated in FIG. 2, the element body 236A is generally rectangular shaped and is cut from material having been grown in the Z axis. Further, the dimension along the Z axis can be kept as small as possible, consistent with the size of the beam 20, in order to minimize the level of voltage that needs to be applied to attain the desired beam modulation. In one embodiment, the element body 236A has a body height 238A (along the Z axis) of approximately 2 mm, a body width 238B (along the Y axis) of approximately 4 mm, and a body length 238C (along the X axis) of approximately 40 mm. Alternatively, the element body 236A can have a different shape and/or dimensions. In one embodiment, one or both ends of the element body 236A are coated with an anti-reflection coating.

Each electrode 236B, 236C is made of an electrically conductive material. In FIG. 2, the first electrode 236B is attached to and positioned on one side of the element body 236A, and the second electrode 236C is attached to and positioned on the opposite side of the element body 236A. In one embodiment, the first electrode 236B is electrically connected to the modulator circuit 28 and the second electrode 236C is grounded. In FIG. 2, an element connector 239 electrically connects the first electrode 236B to the modulator circuit 28.

The modulator circuit 28 changes and accurately adjusts the index of refraction of the element body 236A. In one embodiment, the modulator circuit 28 directs a fixed frequency sinusoidal voltage waveform of sufficient magnitude across the element body 236A via the electrodes 236B, 236C that changes and adjusts the refractive index of the element body 236A.

The design of the modulator circuit 28 can be varied according to the teachings provided herein. In FIG. 2, the modulator circuit 28 includes a circuit board 240A and a plurality of electrical components 240B that are secured or coupled to the circuit board 240A. In the embodiments illustrated in the Figures, at least two of the electrical components 240B of the modulator circuit 28 are inductors that are electrically connected in parallel with the modulator element 26. Stated another way, the modulator circuits 28 illustrated herein, each include two or more inductors that are electrically connected in parallel with each other and the modulator element 26. In certain embodiments, the combination of two or more inductors in parallel (i) allows for the modulator circuit to reach a relatively high resonant frequencies because the value of two or more inductors in parallel is reduced by having them electrically connected in parallel, (ii) maintains the necessary sensitivity to have a relatively large electric field on the modulator element 26 at the resonant frequency, and/or (iii) allows for a relatively small resonant tank circuit.

In one embodiment, any necessary adjustments to the electrical components 240B of the modulator circuit 28 can be made prior to sealing the housing 24 (illustrated in FIG. 1). Alternatively, for example, any adjustments to the electrical components 240B of the modulator circuit 28 can be made through the housing 24.

In one embodiment, for example, depending upon the design, the modulator circuit 28 can provide between approximately 200-400 peak-to-peak volts across the modulator element 26 with an input peak-to-peak voltage from the voltage source 18 of between approximately 0 and 30 volts into the modulator circuit 28. For example, an induced voltage of several hundred volts can be developed with the modulator circuit 28 across the modulator element 26 with an input voltage of approximately 5 volts.

Moreover, in alternative, non-exclusive embodiments, the modulator circuit 28 is a resonant tank circuit that is tunable to resonant frequencies from approximately (i) 200 to 380 MHz; (ii) 200-310 MHz, or (iii) 310-380 MHz. Stated another way, in alternative, non-exclusive embodiments, the modulator circuit 28 is a resonant tank circuit that is tunable to resonant frequencies of at least approximately 200, 225, 250, 275, 300, 325, 350, 375, or 380 MHz.

Figure 3:
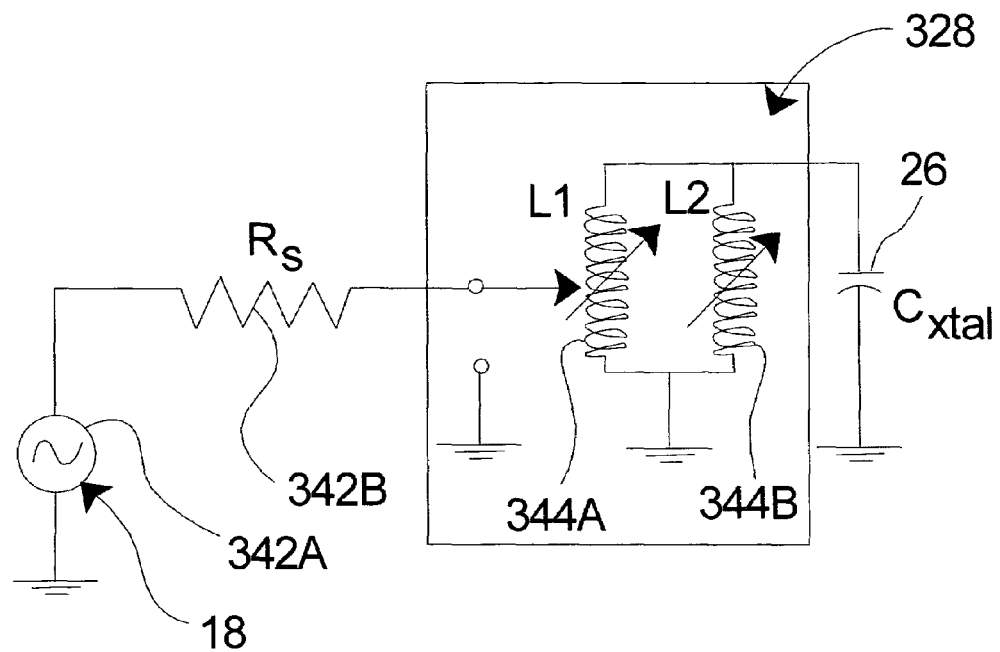
FIG. 3 is a simplified electrical schematic of a modulator element, a voltage source, and one embodiment of a modulator circuit having features of the present invention.

FIG. 3 is a circuit diagram that illustrates one embodiment of a modulator circuit 328. The voltage source 18 and the modulator element 26 (Cxtal) are also electrically represented in FIG. 3. The voltage source 18 is indicated by a series combination of a signal source 342A and a resistor (Rs) 342B.

In FIG. 3, the modulator circuit 328 includes a first inductor (L1) 344A that is electrically connected in parallel to the modulator element 26 and a second inductor (L2)

344B that is electrically connected in parallel to the first inductor 344A and the modulator element 26. The voltage source 18 is electrically connected to the first inductor 344A. The design of each inductor 344A, 344B can be varied to achieve to desired characteristics of the modulator circuit 328.

In one embodiment, one or both of the inductors 344A, 344B can have an inductance of between approximately 0.04 to 0.21 µH. In alternative, non-exclusive examples, suitable values for the first inductor 344A and the second inductor 344B include (i) 0.04 and 0.07 µH, respectively, (ii) 0.07 and 0.07 µH, respectively, (iii) 0.07 and 0.09 µH, respectively, or (iv) 0.1 and 0.1 µH respectively.

Further, one or both of the inductors 344A, 344B can have a relative high Q factor. As used herein, the term Q factor shall mean the quality factor of a coil and the Q factor is equal to the ratio of inductive reactance at a coil at a particular frequency to the resistive losses of the coil. In one embodiment, inductors with a Q factor of at least approximately 200 are considered to have a relatively a high Q factor. In alternative, non-exclusive embodiments one or both of the inductors 344A, 344B have a Q factor of at least approximately 75, 100, 150, 175, 200, 225, 250, 275, 300, 400, 500, 600, 700, 800, 900 or 1000. In one embodiment, one or both of the inductors 344A, 344B can be bulk, off the shelf inductors.

Additionally, one or both of the inductors 344A, 344B can be manually, selectable adjustable to selectively adjust the inductance of the particular inductor 344A, 344B and the modulator circuit 328. In alternative, non-exclusive embodiment, the inductance of one or both of inductors 344A, 344B can be tuned to change approximately 5, 10 or 15 percent. With this design, the overall inductance and the resonant frequency of the modulator circuit 328 is selectively adjustable by adjusting one or both of the inductors 344A, 344B. Because individual modulator elements 26 and components will necessarily have varying electrical characteristics from item to item, the ability to adjust the modulator circuit 28 prior to shipment of the product assures that each such device can be optimized, without significantly increasing the cost to manufacture the product.

Figure 4:
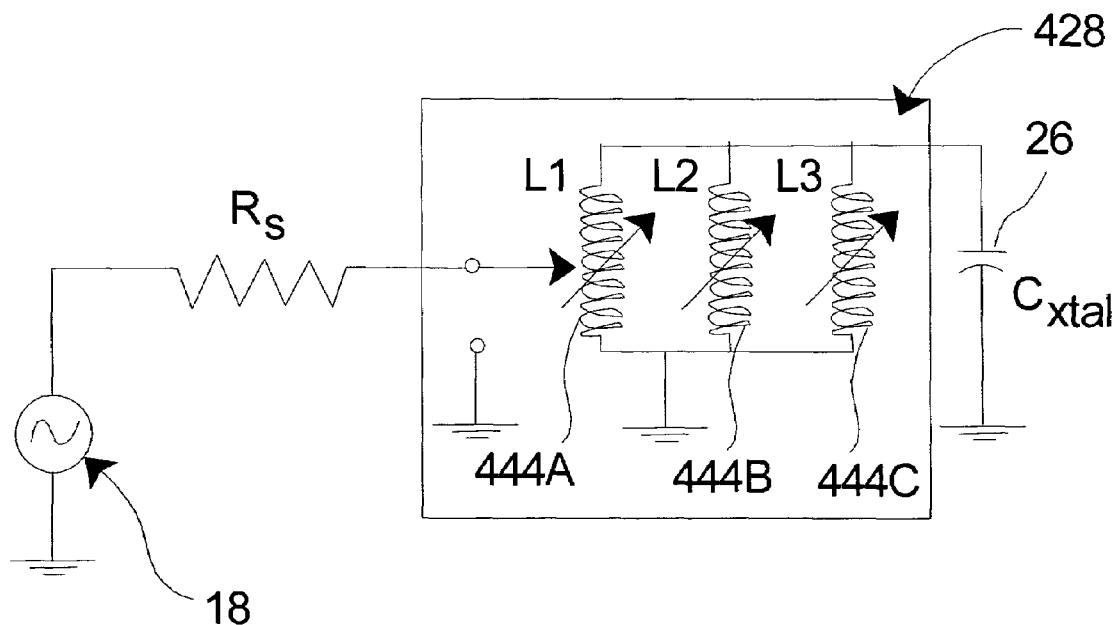
FIG. 4 is a simplified electrical schematic of the modulator element, the voltage source, and another embodiment of a modulator circuit having features of the present invention.

FIG. 4 is a circuit diagram that illustrates another embodiment of a modulator circuit 428. The voltage source 18 and the modulator element 26 (Cxtal) are also electrically represented in FIG. 4 and these components can be similar to the corresponding components described above.

In FIG. 4, the modulator circuit 428 includes (i) a first inductor (L1) 444A that is electrically connected in parallel to the modulator element 26, (ii) a second inductor (L2) 444B that is electrically connected in parallel to the first inductor 444A and the modulator element 26, and (iii) a third inductor (L3) 444C that is electrically connected in parallel to the first inductor 444A, the second inductor 444B, and the modulator element 26. The voltage source 18 is electrically connected to the first inductor 444A. It should be noted that the modulator circuit could be designed to have more than three inductors that electrically connected in parallel with the modulator element 26. For example, in alternative, non-exclusive examples, the modulator circuit could be designed to have 4, 5, 6, 7, 8, or 10 inductors that electrically connected in parallel with the modulator element 26.

The design of each inductor 444A, 444B, 444C can be varied to achieve to desired characteristics of the modulator circuit 428. As provided herein, the first, second and/or third inductors 444A, 444B, 444C can have similar characteristics as the inductors 344A, 344B described above. In alternative, non-exclusive examples, suitable values for the first inductor 444A, the second inductor 444B, and the third inductor 444C include (i) 0.04, 0.04, and 0.07 µH, respectively, (ii) 0.07, 0.07, 0.04 µH, respectively, (iii) 0.07, 0.07, and 0.09 µH, respectively, or (iv) 0.1, 0.1, and 0.1 µH respectively.

Figure 5:
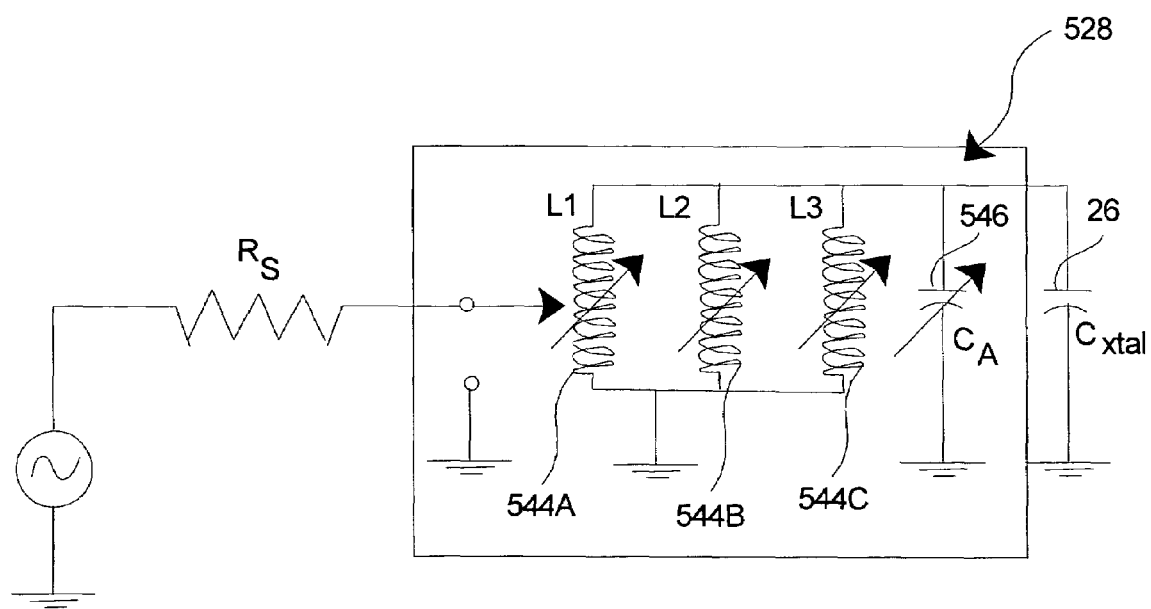
FIG. 5 is a simplified electrical schematic of the modulator element, the voltage source, and still another embodiment of a modulator circuit having features of the present invention.

FIG. 5 is a circuit diagram that illustrates yet another embodiment of a modulator circuit 528. The voltage source 18 and the modulator element 26 (Cxtal) are also electrically represented in FIG. 5 and these components can be similar to the corresponding components described above.

In FIG. 5, the modulator circuit 528 includes (i) a first inductor (L1) 544A that is electrically connected in parallel to the modulator element 26, (ii) a second inductor (L2) 544B that is electrically connected in parallel to the first inductor 544A and the modulator element 26, (iii) a third inductor (L3) 544C that is electrically connected in parallel to the first inductor 544A, the second inductor 544B, and the modulator element 26, and (iv) an added capacitor (Ca) 546 that is connected in parallel to the first inductor 544A, the second inductor 544B, the third inductor 544C, and the modulator element 26. The voltage source 18 is electrically connected to the first inductor 544A. It should be noted that the modulator circuit could be designed to have more than three or less than three inductors that electrically connected in parallel with the modulator element 26.

The design of each inductor 544A, 544B, 544C and the added capacitor 546 can be varied to achieve to desired characteristics of the modulator circuit 528. As provided herein, the first, second and/or third inductors 544A, 544B, 544C can have similar characteristics as the inductors 444A, 444B, 444C described above.

In one embodiment, the added capacitor 546 can be manually, selectable adjustable to selectively adjust the capacitance of the added capacitor 546 and the modulator circuit 328. In alternative, non-exclusive embodiments, the capacitance of the added capacitor 546 can be tuned to change approximately 5, 10 or 15 percent. With this design, the overall capacitance and the resonant frequency of the modulator circuit 528 can also be selectively adjusted by adjusting the added capacitor 546.

It should be noted that in relation to FIGS. 2-5, the voltage input is connected to the proper winding of the first inductor (L1) in order to match the impedance of the voltage source with the impedance of the modulator circuit. The inductors L1, L2, . . . Ln are chosen so that the total inductance Lt of the modulator circuit cooperates with the modulator element to have the desired resonant frequency. For inductors in parallel, the total inductance is equal to Lt=1/(1/L1)+(1/L2)+ . . . (1/Ln).

In one embodiment, (i) the place where the particular winding in which the voltage source is connected to the first inductor L1, (ii) the values of inductors L1, L2, . . . Ln, and (iii) the value of the added capacitor (if utilized) are initially set during the manufacturing process to nominally optimize the resonant frequency and impedance of the modulator circuit to that of the voltage source. However, variations of the modulator element and electronic components may require a final hand adjustment of one or more of the inductors and/or the added capacitor in the manufacturing process before shipment.

While the particular apparatus 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An optical beam modulator that uses a voltage source to modulate an optical beam, the optical beam modulator comprising:
a modulator element adapted to be positioned in the path of the optical beam; and
a resonant tank modulator circuit for directing a voltage to the modulator element to modulate the optical beam, the modulator circuit comprising a first inductor and a second inductor that are electrically connected to the voltage source, the first inductor being electrically connected in parallel to the modulator element; and the second
inductor is electrically connected in parallel to the first inductor and the modulator element.

2. The optical beam modulator of claim 1 wherein at least one of the inductors is manually selectable to adjust the inductance of the modulator circuit.

3. The optical beam modulator of claim 1 wherein a resonant frequency of the modulator circuit is at least approximately 200 MHz.

4. The optical beam modulator of claim 1 wherein a resonant frequency of the modulator circuit is at least approximately 250 MHz.

5. The optical beam modulator of claim 1 wherein a resonant frequency of the modulator circuit is at least approximately 300 MHz.

6. The optical beam modulator of claim 1 wherein at least one of the inductors has a Q factor of at least approximately 100.

7. The optical beam modulator of claim 1 further comprising a third inductor that is electrically connected in parallel to the first inductor, the second inductor, and the modulator element.

8. The optical beam modulator of claim 1 further comprising an added capacitor that is electrically connected in parallel to the first inductor, the second inductor, and the modulator element.

9. The optical beam modulator of claim 8 wherein the added capacitor is manually selectable to adjust the capacitance of the modulator circuit.

10. A precision apparatus including a beam source that generates a beam and the beam modulator of claim 1 positioned in the path of the beam.

11. An optical beam modulator for modulating a beam, the optical beam modulator comprising:
a modulator element positioned in the path of the optical beam; and
a resonant tank modulator circuit that directs voltage to the modulator element, the modulator circuit having a resonant frequency of at least approximately 300 MHz.

12. The optical beam modulator of claim 11 wherein the modulator circuit includes a first inductor and a second inductor that are electrically connected in parallel to each other and the modulator element.

13. The optical beam modulator of claim 12 wherein at least one of the inductors is manually selectable to adjust the inductance of the modulator circuit.

14. The beam optical modulator of claim 12 wherein the modulator circuit includes an added capacitor that is electrically connected in parallel to the inductors and the modulator element.

15. A precision apparatus including a beam source that generates a beam and the optical beam modulator of claim 11 positioned in the path of the beam.

16. A method for modulating an optical beam, the method comprising the steps of:
positioning a modulator element in the path of the optical beam; and
electrically connecting a resonant tank circuit to the modulator element, the circuit having a first inductor and a second inductor connected in parallel to each other and the modulator element.

17. The method of claim 16 further comprising the step of adjusting the resonant frequency of the resonant tank circuit to be at least approximately 200 MHz.

18. The method of claim 16 further comprising the step of adjusting the resonant frequency of the resonant tank circuit to be at least approximately 250 MHz.

19. A method for modulating a beam, the method comprising the steps of:
positioning a modulator element in the oath of the beam;
electrically connecting a resonant tank circuit to the modulator element, the circuit having a first inductor and a second inductor connected in parallel to each other and the modulator element; and
adjusting a resonant frequency of the resonant tank circuit to be at least approximately 300 MHz.

* * * * *